United States Patent
Bold

(10) Patent No.: US 8,096,506 B2
(45) Date of Patent: Jan. 17, 2012

(54) METHOD FOR MAKING WINDOW FRAME

(75) Inventor: Jens Bold, Hamburg (DE)

(73) Assignee: Airbus Deutschland GmbH (DE)

( * ) Notice: Subject to any disclaimer, the term of this patent is extended or adjusted under 35 U.S.C. 154(b) by 813 days.

(21) Appl. No.: 11/597,351

(22) PCT Filed: May 24, 2005

(86) PCT No.: PCT/EP2005/005606
§ 371 (c)(1),
(2), (4) Date: Nov. 21, 2006

(87) PCT Pub. No.: WO2005/115728
PCT Pub. Date: Dec. 8, 2005

(65) Prior Publication Data
US 2008/0197237 A1    Aug. 21, 2008

Related U.S. Application Data

(60) Provisional application No. 60/600,103, filed on Aug. 9, 2004.

(30) Foreign Application Priority Data

May 24, 2004    (DE) .......................... 10 2004 025 381

(51) Int. Cl.
B64C 1/14 (2006.01)
B64C 1/00 (2006.01)
B64D 7/00 (2006.01)
E06B 1/04 (2006.01)
E06B 3/00 (2006.01)
E04C 2/38 (2006.01)
B32B 5/12 (2006.01)
B32B 7/00 (2006.01)
B28B 5/00 (2006.01)

(52) U.S. Cl. .................... 244/129.3; 52/204.1; 52/204.5; 52/656.2; 52/656.5; 428/105; 428/113; 428/119; 244/129.1; 244/121; 264/250

(58) Field of Classification Search ................ 52/204.1, 52/204.5, 656.2, 656.5; 428/105, 113, 119; 244/129.3, 129.1, 121; 264/250
See application file for complete search history.

(56) References Cited

U.S. PATENT DOCUMENTS 4,046,933 A * 9/1977 Stefanik .......................... 428/81
6,443,390 B2 * 9/2002 Bourgon et al. ............... 244/1 R
(Continued)

FOREIGN PATENT DOCUMENTS

DE    102 51580 A1    9/2003
(Continued)

Primary Examiner — Brian Glessner
Assistant Examiner — Omar Hijaz
(74) Attorney, Agent, or Firm — Lerner, David, Littenberg, Krumholz & Mentlik, LLP

(57) ABSTRACT

A method for making a window frame for installation in the exterior shell of an aircraft, which comprises at least one outer flange, an inner flange, and a vertical flange arranged perpendicular to and between these two flanges, contemplates that first a semifinished part comprising multiple, individual substructures is made, which next is inserted into a molding tool, into which, under pressure and temperature, resin is injected, and that the component made in this manner subsequently is hardened in the molding tool. The semifinished part has a layer structure, which comprises a web material, fiber bundles, or a combination of fiber bundles and web material.

13 Claims, 4 Drawing Sheets

Figure 1:
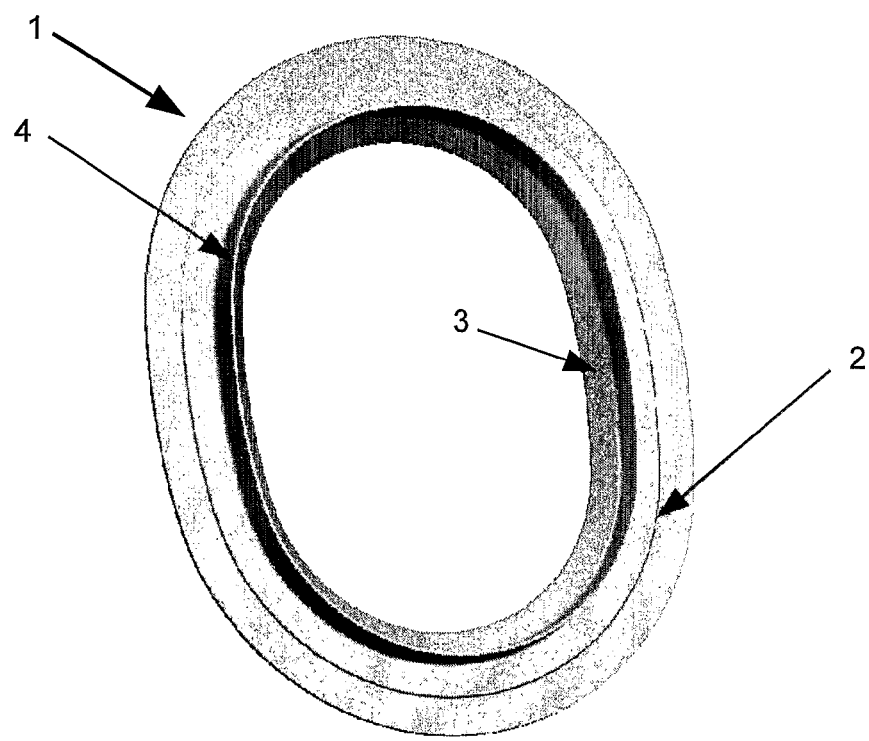

| U.S. PATENT DOCUMENTS | | | |
|---|---|---|---|
| 6,641,893 B1 * | 11/2003 | Suresh et al. | 428/105 |
| 7,138,167 B2 | 11/2006 | Sakonjo et al. | |
| 7,175,795 B2 * | 2/2007 | Eberth et al. | 264/250 |
| 2003/0168775 A1 | 9/2003 | Eberth et al. | |
| 2003/0222371 A1 * | 12/2003 | Edelmann et al. | 264/103 |
| 2003/0234322 A1 * | 12/2003 | Bladt et al. | 244/129.3 |

| FOREIGN PATENT DOCUMENTS | | | |
|---|---|---|---|
| EP | 1529865 A1 * | 5/2005 | |
| GB | 2 225 227 A | 5/1990 | |
| JP | 2004-114586 A | 4/2004 | |
| WO | 2004/016844 A1 | 2/2004 | |

* cited by examiner

METHOD FOR MAKING WINDOW FRAME

REFERENCE TO RELATED APPLICATIONS

This application claims the benefit of the filing date of U.S. Provisional Patent Application No. 60/600,103 filed Aug. 9, 2004, the disclosure of which is hereby incorporated herein by reference and of the German Patent Application DE 10 2004 025 381 filed May 24, 2004, the disclosure of which is hereby incorporated herein by reference.

FIELD OF THE INVENTION

Method of manufacturing a window frame for installation in an exterior shell of an aircraft.

TECHNOLOGICAL BACKGROUND

In most of the aircraft made and in operation today, window frames made of aluminum are used, which comprise a part which is made by forging, truing and cupping. The window frame is organized into a total of three regions: an outer flange, an inner flange, and a vertical flange arranged perpendicular to and between these two flanges. The window frames are typically connected with two rows of rivets over the outer flange with the aircraft structure or with the exterior shell of the aircraft. A window element rests on the inner flange, which typically comprises two panes and a sealing arranged therebetween and which is fixed in its position via a retainer or downholder, which is connected with the window frame.

In addition to fixing the window element, such a window frame also has the function of absorbing the strain increase, which occurs on the edge of the comparably large cut-out for the window mounted in the load-transferring exterior shell. The outer flange of the window frame thereby serves, on the one hand, for reinforcement of this cut-out and on the other hand, via the outer flange, the frame and the exterior shell are connected to one another by means of rivets. Since the manufacture of the known aluminum window frame typically takes place by means of forging, it is not possible to achieve a cross-sectional distribution of the frame profile that is favorable for the rivet force distribution, since the slant of the flange may amount to a maximum of approximately two angular degrees, in order to enable a simple riveting.

The inner flange serves to receive the window element, whereby here a slanting of the mounting of the window is simplified. Simultaneously, the existing load from the interior pressure, which prevails in the passenger cabin, is transferred via this inner flange to the exterior shell of the aircraft.

The vertical flange serves usually exclusively as a reinforcement rib on the frame, in order to minimize the tension in the exterior shell with the least possible weight. On this vertical flange, also the eye bolts are attached, with which, typically, the downholder or retainer for the window elements are held in their position. At the same time, the vertical flange also forms the guide upon mounting of the window element.

SUMMARY OF THE INVENTION

It may be an object of the present invention to provide a method of manufacturing a window frame, which permits a simple, flexible, and cost-effective manufacture of such a window frame.

According to an exemplary embodiment of the present invention, a method for making a window frame for installation in the exterior shell of an aircraft is provided, comprising at least one outer flange, one inner flange, and a vertical flange arranged perpendicular to and between these flanges, whereby the connection with the aircraft structure takes place via the outer flange, and whereby on the inner flange, a window element to be held is attached, which is held via the vertical flange.

According to an aspect, firstly a semifinished part comprised of multiple, individual substructures, is made, which next is inserted into a molding tool, and in which, under pressure and temperature, resin is injected. The component made in this manner is subsequently hardened in the molding tool.

The invention may make possible the cost effective manufacturing of a plurality of different window frames made in a fiber composition construction, by means of which, compared to the aluminum window frames used up to now, a weight savings of up to 50 percent may be achieved. In spite of this great weight savings potential, the costs for such a component, compared to a window frame made from an aluminum forged part, are believed to not rise.

At the same time, it may be possible to make the fiber window frame according to the present invention with a tolerance of only approximately 0.2 mm with an average wall thickness of 5 mm, which corresponds to a manufacturing tolerance of approximately 4 percent. With aluminum forged frames, in contrast, depending on the manufacturing method, tolerances of approximately 1.5 mm are accepted, which corresponds to a manufacturing tolerance of approximately 30 percent with the same will thickness. Therefore, by means of the present invention, not only the weight fluctuations between the individual window frames may be substantially reduced, but also, at the same time, the installation of the frame in an aircraft or the mounting of the window element in the frame may be simplified. Finally, further advantages which are believed to be achieved are increased safety as well as a greatly improved thermal insulation of the window frame according to the invention.

SHORT DESCRIPTION OF THE DRAWINGS

Figure 2:
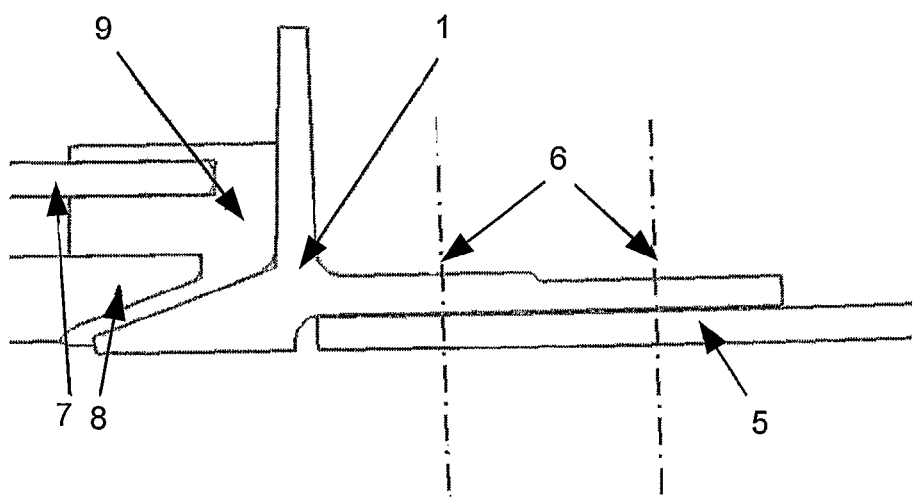
Figure 3:
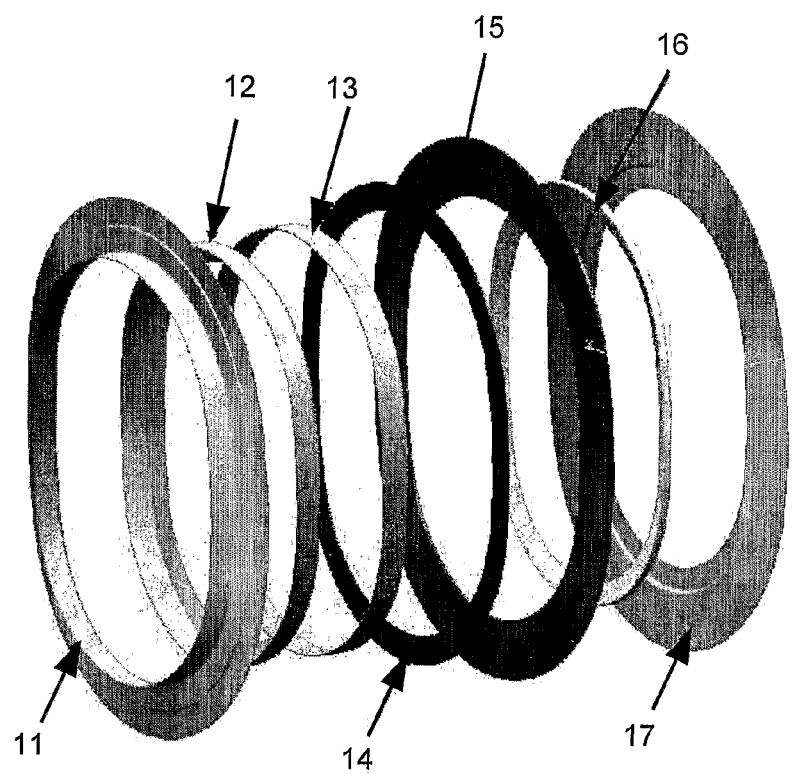
Figure 4:
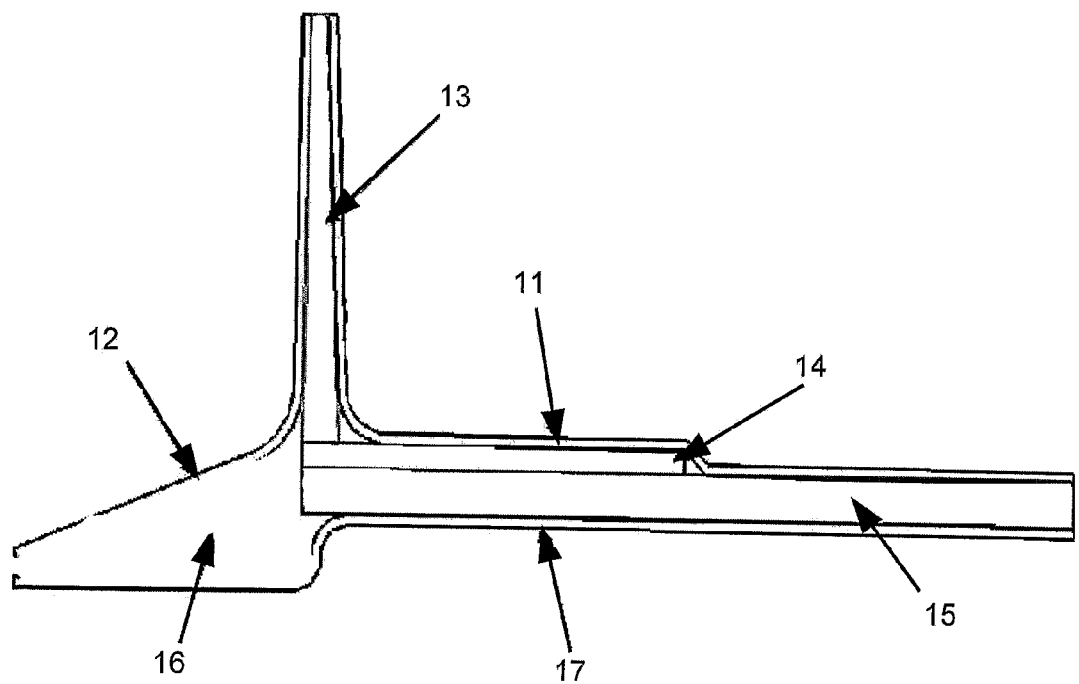
Figure 5:
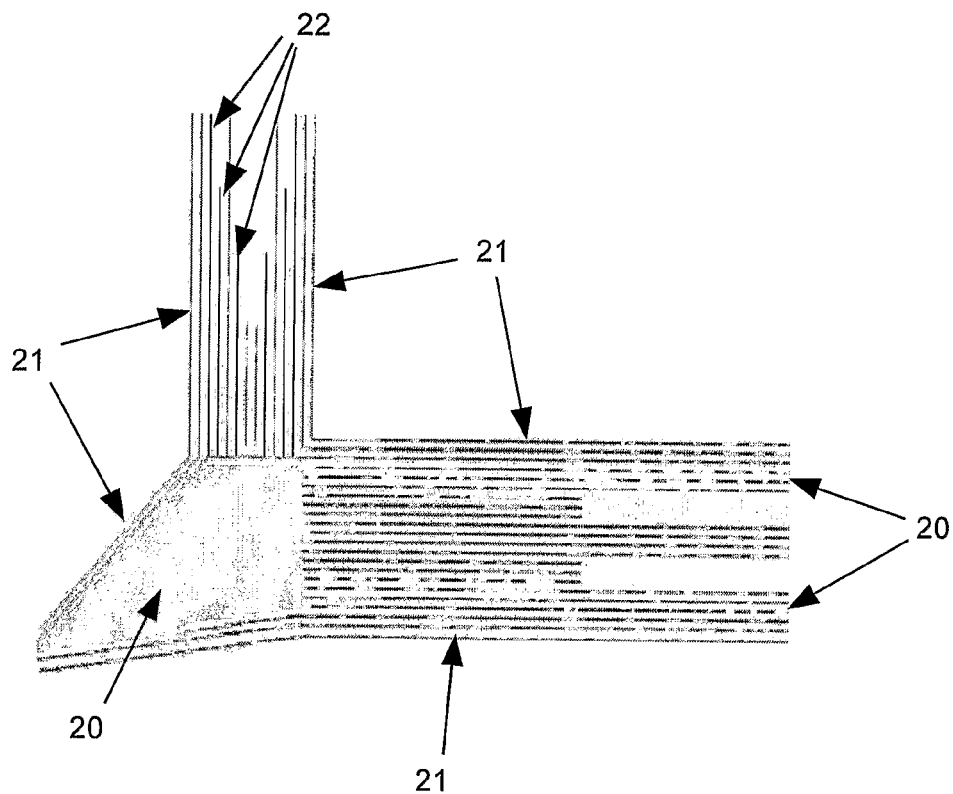
Figure 6:
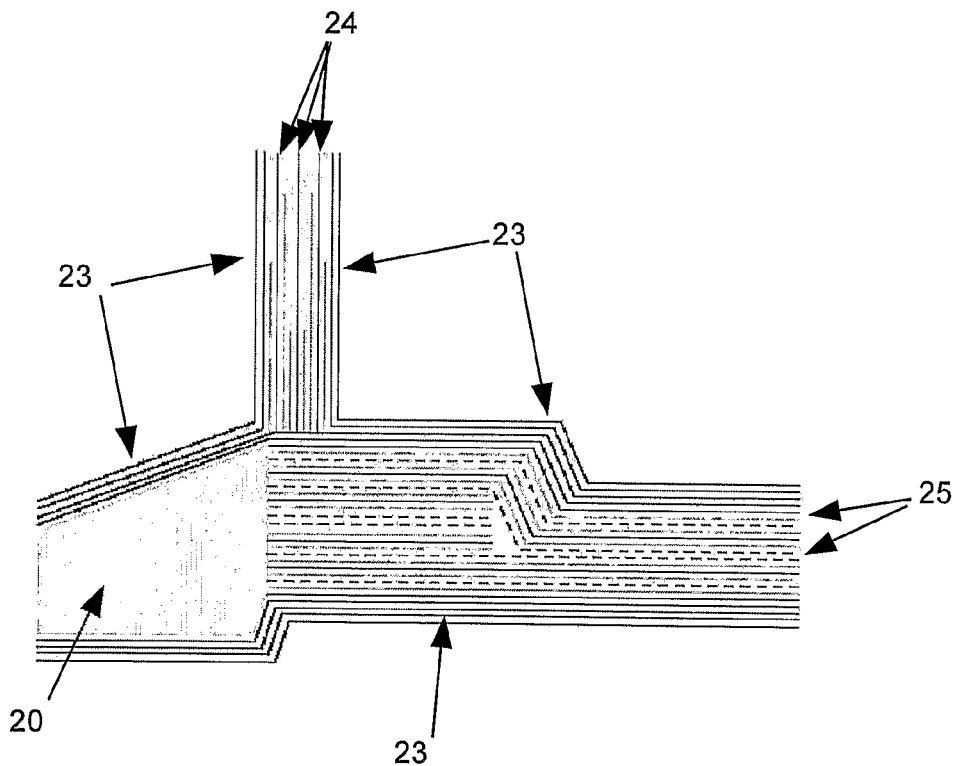
Figure 7:
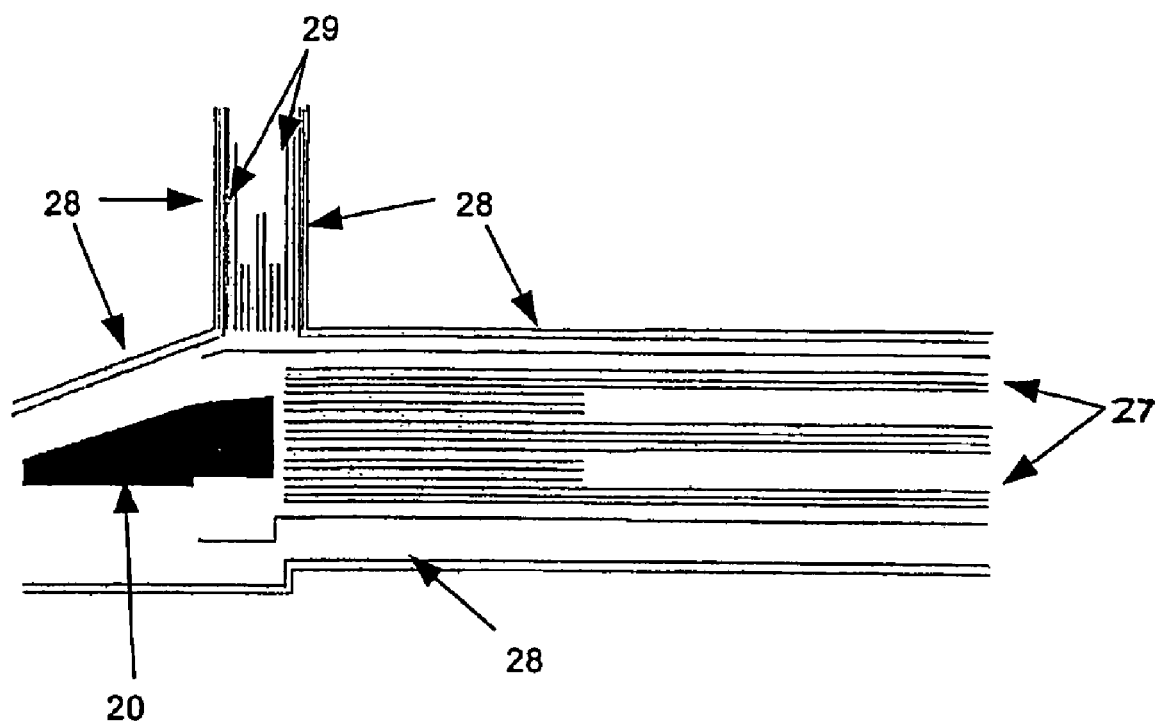

Next, the invention will be described in greater detail with reference to one embodiment shown in the accompanying figures. In the figures:

FIG. 1 shows a window frame in perspective view;
FIG. 2 shows a detail section through the installation position of a window frame according to FIG. 1;
FIG. 3 shows the structure of the window frame of FIG. 1 in an exploded view;
FIG. 4 shows a detail section through a window frame of FIG. 1;
FIG. 5 shows the structure of a first perform in a sectional view;
FIG. 6 shows the structure of a second preform in a sectional view; and
FIG. 7 shows the structure of a third perform in a sectional view.

DETAILED DESCRIPTION OF EXEMPLARY EMBODIMENTS

The window frame 1 shown in FIG. 1 is made with a fiber construction and, like the known aluminum forged frames, also has an outer flange 2, an inner flange 3, as well as a vertical flange 4 arranged between these two flanges. In contrast to common aluminum window frames, the outer flange 2 in this case, however, has a uniform circumferential edge. In addition, this outer flange 2, in contrast to a corresponding aluminum forged part has a varying thickness in different radial regions. This may lead to a substantially improved material utilization in the region of the riveting and the shell cut-out. FIG. 2 more clearly shows this in a detail section, in which the installation position of such a window frame 1 in the outer shell 5 of an aircraft is shown. Also shown in this figure are the rivet positions 6 for the connection of the frame with the outer shell 5, as well as two window panes 7 and 8, which together with a sealing 9, form the window element.

The window frame 1 is made by means of the so-called "resin-transfer-molding" or RTM technology. In this connection, first a mold part, the so-called preform, is made from fibers. This is next placed in a two-part molding tool, the molding tool is closed, and under pressure and temperature, resin is injected into the molding tool. The complete component 1 subsequently is hardened within the molding tool.

The preform is made in the so-called sub-preform technique, in which the complete window frame 1 is combined from individual substructure elements or sub-preforms 11 through 17, as shown in the exploded view in FIG. 3. FIG. 4 shows in a sectional representation the structure of the complete fiber composition-window frame 1 of the individual substructures 11 through 17. The comparatively high number of different substructures makes possible in a simple manner an adaptation to different height specifications, which are placed on such manufactured window frames 1. Thus, for example, with a lower load, the sub-preform or substructure element 14 can be eliminated, while, on the contrary, with higher specifications, one or more substructure elements 14 or even possibly 15 can be attached. The different thicknesses, which exist hereby, are compensated for by the good connectibility of the individual sub-preforms. With different wall thicknesses, the aircraft shell 5 can be displaced parallel for compensation of the entire region to the sub-preform 15; also this results in good connectibility.

The preform can be made in principle in three different ways:
  from a web semifinished part,
  from fiber bundles,
  from a combination of web semifinished parts and fiber bundles.

FIG. 5 shows a section through the layer structure of the window frame 1 comprising the web semifinished parts. In this figure, reference numeral 20 designates the 0° hub in the inner flange, reference numeral 21 designates the ±60° layers in all outer regions as well as the ±60° layers extending from the outer flange 2 to the inner flange 3, and reference numeral 22 designates the 0° and 90° layers in the region of the vertical flange 4. These layer directions are measured on the interface of the outer flange 2, inner flange 3, and vertical flange 4. Outside of this region, the following facts are provided for the curvilinear placed web semifinished part:
  Vertical flange 4:
  All fibers remain in the direction, in which they were measured; Inner flange 3 and outer flange 2:
  0° fibers remain in the direction, in which they were measured;
  ±45° fibers remain in the direction, in which they were measured, but are curved;
  ±60° fibers remain in the direction, in which they were measured, but are curved.

FIG. 6 shows a load-suitable layer structure with fiber bundles, whereby, again, a section through the layer structure of the fiber bundle is shown. In this figure, reference numeral 20 designates the 0° core in the inner flange, reference numeral 23 designates the fiber bundle with a ±60° layer in all outer regions, as well as the ±60° layer extending from the outer flange 2 to the inner flange 3, reference numeral 24 designates the fiber bundle with 0° and 90° layers in the region of the vertical flange 4, and reference numeral 25 represents the fiber bundle with ±45° layers in the region of the outer flange 2. These layer directions are measured on the interface of the outer flange 2, inner flange 3, and vertical flange 4. In order to achieve a fiber progression, in which the fibers follow the load direction, a structure is selected for the window frame 1, which is summarized as follows:
  Outer flange 2:
  Quasi-isotropic, radial structure in the region of the riveting;
  Vertical flange 4:
  0° core for receiving the primary load;
  ±60° layers on the outer sides.
  Inner flange 3:
  0° direction predominantly;
  ±60° layers on the outer sides;
  90° for reinforcement.

In this manner, the following details are provided for the respectively placed fiber:
  Vertical flange 4:
  All fibers remain in the direction, in which they were measured.
  Inner flange 3 and outer flange 2:
  0° fibers remain in the directions in which they were measured;
  ±45° fibers change their angle to ±60°;
  ±60° fibers change their angle to ±70°.

Finally, FIG. 7 shows a layer structure with a combination of webbing and fiber bundles. Here, again reference numeral 20 designates the web layer of 0° hub in the inner flange, while reference numeral 27 designates the 0° coiled push, 28 designates the ±60° web layer, and 29 designates the 0°/90° web layers.

The window frame 1 made in this manner may have an approximately 50 percent weight savings with approximately the same manufacturing costs compared to the common aluminum window frames. Its tolerances are believed to lie essentially lower than the tolerances of the corresponding aluminum components. At the same time, the frame is believed to offer higher safety and better thermal insulation than the common aluminum window frame.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A method of manufacturing a window frame for installation in an exterior shell of an aircraft with an aircraft structure, the window frame comprising an outer flange, an inner flange, and a vertical flange, wherein the vertical flange is arranged substantially perpendicular to the inner and outer flanges and between the inner and outer flanges, wherein the outer flange is adapted for a connection to the aircraft structure for connecting the window frame to the aircraft, and wherein a window element abuts against the inner flange for support, the method comprising: providing a semifinished part comprised of multiple, individual substructures with a first substructure, a second substructure, a third substructure, a fourth substructure and a fifth substructure, wherein the substructures contain fibers which are arranged in an angle in relation to a 0° direction, wherein the fourth substructure contains layers each having fibers oriented in the same 0° direction; and wherein the substructures are adjusted during manufacturing of the semifinished part such that fibers of the first substructure, the second substructure and the third substructure have relative angles of ±60° in relation to the fibers of the fourth substructure; and wherein the fifth substructure is arranged on the outer flange in a riveting region such that the outer flange has a varying thickness in different radial regions, providing the semifinished part having a layer structure made of fiber bundles; wherein the outer flange comprises a quasi-isotropic structure in the riveting region.

2. The method of claim 1, further comprising:
assembling the multiple, individual substructures for providing the semifinished part, such that the fourth and fifth substructures are arranged on the first substructure, wherein the first substructure comprises ±60° layers extending from the outer flange to the inner flange;
wherein the multiple, individual substructures are assembled before performing an injection of a resin for connecting the multiple, individual substructures.

3. The method of claim 2, further comprising:
connecting the multiple, individual substructures by performing resin injection;
wherein rivet positions are arranged at different radial regions of the outer flange for connection of the window frame with an outer shell.

4. The method of claim 1, further comprising:
providing a curvilinear placed semifinished part with a layer structure made from a web material;
wherein ±60° fibers remain in the same angle and are curved outside of a region of an interface of the outer flange, inner flange and vertical flange.

5. The method of claim 1, further comprising:
providing the semifinished part having a layer structure, which comprises a combination of fiber bundles and web material;
wherein the outer flange comprises a quasi-isotropic structure in the riveting region.

6. The method of claim 1, wherein the relative angles are measured at an interface of the outer flange, the inner flange and the vertical flange.

7. A window frame for an aircraft comprising:
an outer flange, which has a first layer structure with fibers,
an inner flange, which has a second layer structure with fibers arranged around a hub, and
a vertical flange, which has a third layer structure with fibers, wherein the vertical flange is arranged between the outer flange and the inner flange in an upright position,
wherein the hub has fibers positioned at an angle of 0° and,
wherein the first layer structure, the second layer structure and the third layer structure each includes layers having fibers oriented in the same direction at an angle of ±60° relative to the fibers of the hub;
wherein the outer flange has a fourth layer structure such that the outer flange has different heights at different radial regions in a riveting region; and
wherein the outer flange comprises a quasi-isotropic structure in the riveting region.

8. A window frame according to claim 7, wherein the first layer structure extends from the outer flange to the inner flange; and
wherein the fibers of the first layer structure and the second layer structures are arranged around the hub.

9. A window frame according to claim 7, wherein the first layer structure, the second layer structured the third layer structure and the fourth layer structure include a web material.

10. A window frame according to claim 7, wherein the first layer structure, the second layer structure, the third layer structure and the fourth layer structure have a fiber bundle.

11. A window frame according to claim 7, wherein the first layer structure, the second layer structure, the third layer structure and a fourth layer structure have a combination of fiber bundles and a web material.

12. A method of claim 1, wherein the semifinished part comprises a sixth substructure arranged in the outer flange.

13. A window frame according to claim 7,
wherein the outer flange further comprises a fifth layer structure,
wherein the fifth layer structure includes layers having fibers oriented in the same direction at an angle of ±/−45° relative to the fibers of the hub.

* * * * *